S. W. MATHER.
VEHICLE STEP.
APPLICATION FILED APR. 10, 1911.
1,026,102.
Patented May 14, 1912.
2 SHEETS—SHEET 2.
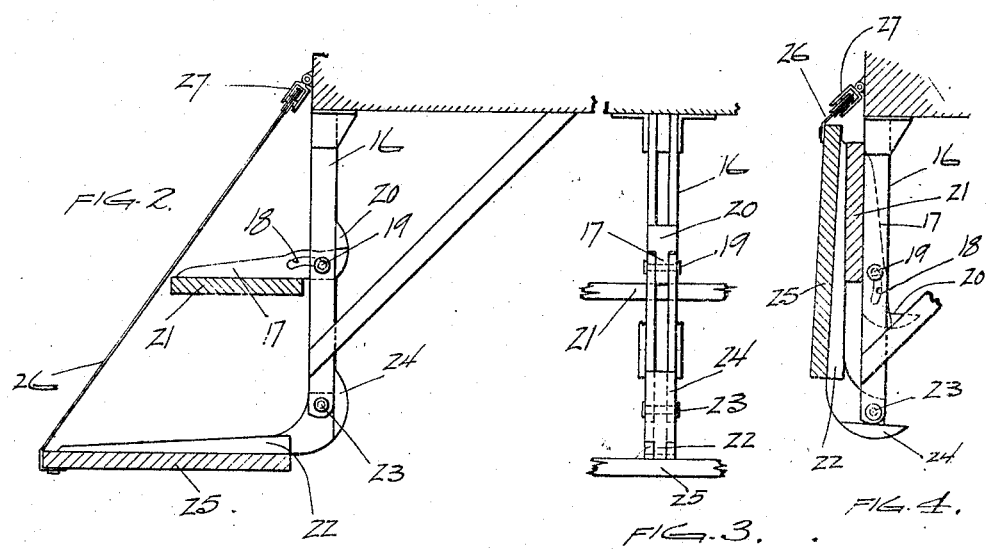
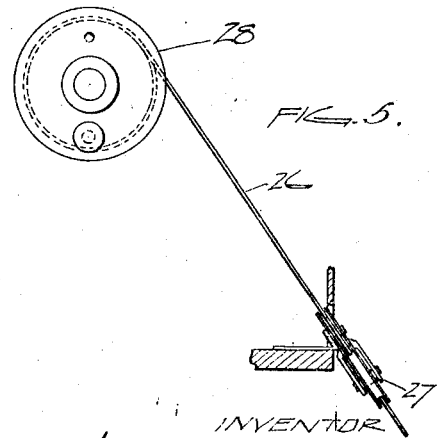
WITNESSES:
INVENTOR
Samuel W. Mather
BY
J. B. Fay
ATTORNEY

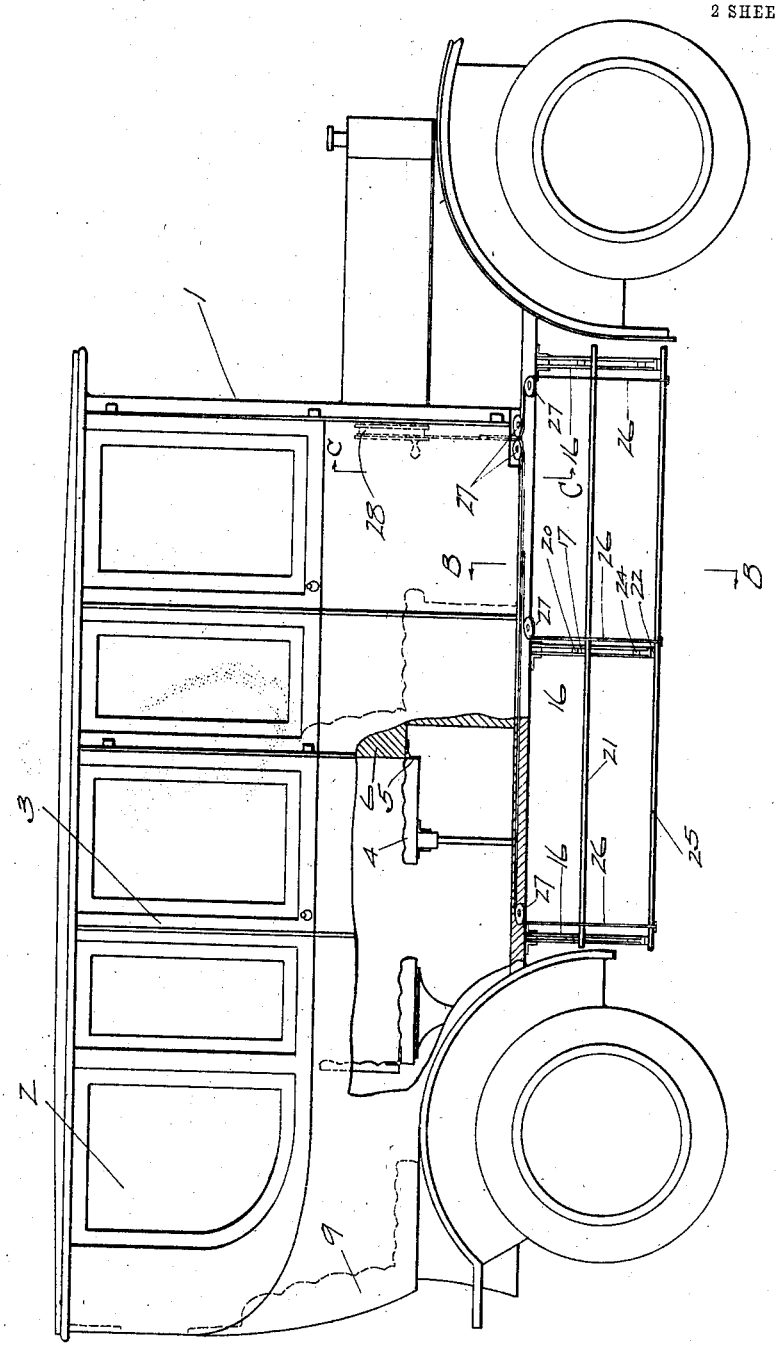

UNITED STATES PATENT OFFICE.

SAMUEL W. MATHER, OF CLEVELAND, OHIO.

VEHICLE-STEP.

1,026,102.

Specification of Letters Patent.

Patented May 14, 1912.

Application filed April 10, 1911. Serial No. 620,107.

*To all whom it may concern:*

Be it known that I, SAMUEL W. MATHER, a citizen of the United States, and a resident of Cleveland, county of Cuyahoga, and State of Ohio, have invented a new and useful Improvement in Vehicle-Steps, of which the following is a specification, the principle of the invention being herein explained and the best mode in which I have contemplated applying that principle, so as to distinguish it from other inventions.

The present invention relates in general to passenger vehicles, and its principal object is the provision of an improved step for such vehicles.

To the accomplishment of this and related objects, said invention, then, consists of the means hereinafter fully described and particularly pointed out in the claims.

The annexed drawings and the following description set forth in detail certain mechanism embodying my invention, such disclosed means constituting, however, but one of the various mechanical forms in which the principle of the invention may be used.

In said annexed drawings:—Figure 1 is a side elevation partly broken away of a vehicle embodying my invention; Fig. 2 is a sectional detail on the line B—B, Fig. 1; Fig. 3 is a rear elevation of the detail shown in Fig. 2; Fig. 4 is a view similar to Fig. 2 with the parts in different operative position; and Fig. 5 is a sectional detail on the line C—C in Fig. 1.

The vehicle body 1 comprises in general a driver's compartment and a passenger carrying compartment 2 designed to hold a considerable number of persons. Access to the compartment 2 is had by the door 3 which, of course, may be duplicated on the two sides of the body. A seat 4 extends transversely of the compartment 2, opposite the door 3, but in order that the seat may not be an obstruction to the entrance of passengers to the other seats in the compartment, the seat 4 is hinged at 5 to the front wall 6 of the compartment 2. A seat 9 extends transversely of compartment 2 at the rear end thereof, while between the door 3 and the seat 9 is still another transverse seat which is so arranged that it may be opened, so to speak, to allow access to the rear seat 9.

The invention provides an improved step or running board construction. A plurality of supports 16 are rigidly secured to the body 1 along its sides, and in each support 16 is provided a pin 19 which is engaged by an eccentric slot 18 formed in a bracket 17, and to the series of brackets 17 is secured a step or running board 21. A pin 23 is provided in the support 16 below the pin 19, and on the pin 23 is pivoted a bracket 22, the series of brackets 22 carrying a step or running board 25.

In order that the steps 21 and 25 may not descend below a horizontal position, the brackets which carry them are formed with projections adapted to engage the supports 16 when the steps are in horizontal position. A preferable construction for this purpose is that shown in the drawings, in which a support 16 consists of two parallel members between which the brackets 17 and 22 extend, the rear ends of the brackets being formed with enlargements 20 and 24 respectively. The steps may be swung on their pivotal axes by any suitable connections extending to the driver's compartment, or, of course, they may be operated manually. Preferably however, a cable 26 is connected with the lower step 25, and after being led over suitable pulleys 27, is secured to a drum 28 adjacent to the driver's seat. The step 25 is of a width greater than the vertical distance from the pivotal axis 23 to the pivotal axis 19. Assume the steps to be in lowered position, as illustrated in Figs. 1 and 3. After the passengers have entered the car, the driver rotates the drum 28 which, by means of the cable 26, swings the lower step 25 upwardly on its pivotal axis. Owing to its width, the step 25 strikes the step 21 and swings it upwardly on its pivotal axis until finally the steps assume the positions illustrated in Fig. 5, the step 21 sliding down behind the step 25 by reason of the slots 18 in the brackets 17. When, then, the steps are in what may be termed closed position, the step 25 presents a solid appearance conforming with the side of the body, and the large steps necessary in a car of such capacity are compactly folded up into a small space and with a resulting pleasing appearance. By releasing the drum 28, the steps assume a horizontal position by their own weight, and are securely held in horizontal position by the projections 20 and 24 on the brackets 17 and 22 which engage the supports 16.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a vehicle, the combination of a vertical support; a bracket pivoted to said support; a step secured to said bracket; a second bracket pivoted to said support below the first bracket; a step secured to the second bracket, the width of the last-named step being greater than the distance between the pivotal axes of said brackets, and the first bracket and step being unconnected with the second bracket and step; and means for swinging the second bracket on its pivotal axis.

2. In a vehicle, the combination of a plurality of vertical supports; a series of brackets pivoted to the respective supports; a step secured to said brackets; a second series of brackets pivoted to the respective supports below the brackets of the first series; a step secured to the brackets of the second series, the width of the last-named step being greater than the distance between the pivotal axes of the brackets of the first and second series, and the upper brackets and step being unconnected with the lower brackets and step; projections provided at the inner ends of the respective brackets and designed to engage said supports when the steps are in horizontal position; and means for swinging the second series of brackets on their pivotal axes.

3. In a vehicle, the combination of a plurality of vertical supports; a series of brackets pivotally and slidably secured to said supports; a step secured to said brackets; a second series of brackets pivoted to the respective supports below the brackets of the first series; a step secured to the brackets of the second series; the width of the last-named step being greater than the distance between the pivotal axes of the brackets of the first and second series; projections provided at the inner ends of the respective brackets and designed to engage said supports when the steps are in horizontal position; and means for swinging the second series of brackets on their pivotal axes.

4. In a vehicle, the combination of a plurality of vertical supports; a series of brackets pivotally and slidably secured to said supports; a step secured to said brackets; a second series of brackets pivoted to the respective supports below the brackets of the first series; a step secured to the brackets of the second series, the width of the last-named step being greater than the distance between the pivotal axes of the brackets of the first and second series; projections provided at the inner ends of the respective brackets and designed to engage said supports when the steps are in horizontal position; a cable connected with the lower step; and a drum for operating said cable.

Signed by me this 7th day of April, 1911.

SAMUEL W. MATHER.

Attested by—
 ROBERT M. SEE,
 D. T. DAVIES.